(12) United States Patent
Neesham (10) Patent No.: US 12,145,540 B2
(45) Date of Patent: Nov. 19, 2024

(54) EXTENDABLE ROOF TOP CARGO CARRIER FOR A VEHICLE

(71) Applicant: Tony Neesham, Kennebunk, ME (US)

(72) Inventor: Tony Neesham, Kennebunk, ME (US)

(*) Notice: Subject to any disclaimer, the term of this patent is extended or adjusted under 35 U.S.C. 154(b) by 358 days.

(21) Appl. No.: 17/733,504

(22) Filed: Apr. 29, 2022

(65) Prior Publication Data

US 2023/0032110 A1  Feb. 2, 2023

Related U.S. Application Data (63) Continuation-in-part of application No. 17/531,964, filed on Nov. 22, 2021, now Pat. No. 11,667,245.

(60) Provisional application No. 63/227,412, filed on Jul. 30, 2021.

(51) Int. Cl.
*B60R 9/045* (2006.01)

(52) U.S. Cl.
CPC .................... *B60R 9/045* (2013.01)

(58) Field of Classification Search
CPC .......... B60R 9/042; B60R 9/045; B60R 9/055
See application file for complete search history.

(56) References Cited

U.S. PATENT DOCUMENTS

| | | |
|---|---|---|
| 3,902,642 A | 9/1975 | McNeece |
| 4,345,706 A | 8/1982 | Benit |
| 4,601,419 A | 7/1986 | Bird |
| 4,867,361 A | 9/1989 | Burnham |
| 5,799,848 A * | 9/1998 | Wills ................. B60R 9/055 224/329 |
| 6,152,339 A | 11/2000 | Kreisler |
| 6,679,673 B1 | 1/2004 | Stahler et al. |
| 8,857,684 B1 | 10/2014 | Calvert |
| 9,731,659 B2 | 8/2017 | Goldberg |
| 10,286,853 B1 * | 5/2019 | Carbone ............. B60P 1/003 |
| 10,406,986 B2 | 9/2019 | Roy et al. |
| 10,569,714 B2 * | 2/2020 | Amoriello ........... F04D 29/044 |
| 2004/0188478 A1 | 9/2004 | Williams |
| 2005/0023314 A1 | 2/2005 | Williams et al. |
| 2005/0045678 A1 * | 3/2005 | Hurd ................. B60R 9/055 224/319 |
| 2006/0043130 A1 * | 3/2006 | Dabrowski ......... B60R 9/055 224/328 |
| 2014/0132022 A1 * | 5/2014 | Espig ................. B60J 7/1657 296/37.7 |
| 2017/0144609 A1 * | 5/2017 | Poudrier ............ B60R 9/045 |
| 2021/0178979 A1 | 6/2021 | Buchholtz Storm et al. |

(Continued)

*Primary Examiner* — Brian D Nash
(74) *Attorney, Agent, or Firm* — Sue C. Watson; Southern Plains IP Law PLLC (57) ABSTRACT

A cargo carrier for the rooftop of a vehicle has a housing which includes a first opening formed therethrough which forms a first compartment therein for cargo storage. The cargo carrier also includes at least one module movably connected to the housing. The module has an opening therethrough which forms a second compartment in communication with the first compartment, and the module is configured to fit within the housing in a retracted position and extend away from the housing in an extended position. A portion of the module and a portion of the housing overlap each other and connect together in the extended position. When the module is positioned within the portion of the housing, an end portion of the module is positioned against a rim of the housing to provide the retracted position.

17 Claims, 10 Drawing Sheets

(56) References Cited

U.S. PATENT DOCUMENTS

| | | | | |
|---|---|---|---|---|
| 2022/0158583 A1* | 5/2022 | Hammerlund | ........ | H02S 10/40 |
| 2023/0032972 A1* | 2/2023 | Neesham | ............ | B60R 9/055 |
| 2023/0346093 A1* | 11/2023 | Neesham | ............ | A45C 7/0031 |

* cited by examiner

EXTENDABLE ROOF TOP CARGO CARRIER FOR A VEHICLE

CROSS-REFERENCE TO RELATED APPLICATIONS

The present invention is a non-provisional utility patent application which is a continuation-in-part of U.S. non-provisional patent application Ser. No. 17/531,964, entitled "EXTENDABLE ROOF TOP CARGO CARRIER FOR A VEHICLE", filed Nov. 22, 2021, which is based upon U.S. provisional patent application Ser. No. 63/227,412, entitled "EXTENSIBLE ROOFTOP CARGO CARRIER FOR VEHICLES", filed Jul. 30, 2021, both of which are hereby incorporated by reference herein in their entirety.

FIELD OF THE INVENTION

The present invention relates to carriers for carrying cargo on a roof top of a vehicle, such as an automobile. In particular, the present invention relates to cargo carriers positioned on a roof top of a vehicle which are extendable, i.e., configured to telescopically expand and retract.

BACKGROUND

Cargo carriers held on the rooftop of a vehicle are commonly used when one or more persons travel for work, enjoyment, vacations, when moving locations, and the like. In some instances, a standard piece of luggage is strapped or connected to rails positioned on the roof of a vehicle. Of course, when moving more than clothing, such as taking skis on a vacation, tennis rackets, and other sporting goods of various types, configurations, and dimensions, it can be problematic as to how they may be safely contained on the roof top of a vehicle, such as a car, SUV, light truck, van, and the like.

Finding cargo carriers that are sufficiently strong and of a sufficient size to hold various configurations and dimensions of different objects on a roof top of a vehicle can be challenging. In addition, when only a few objects, such as a few pieces of luggage, are used in a large cargo carrier, the luggage may shift within the larger space and it may become damaged, or contents within the luggage or other objects placed within the same cargo space may be damaged.

This is because currently available products are not adaptable to accommodate varying sizes of cargo. What a person would carry with him/her on a weekend at the beach may be significantly less and different than what a person would carry with him/her on a two-week vacation to camp and/or snow ski in the mountains. Current products are not configured to conformationally adapt to their owners varying cargo requirements.

A container or cargo carrier which is small enough for a short weekend outing yet sufficiently extendable to accommodate snow skis and a two-week vacation in the mountains would be desirable. Such a cargo carrier would provide a choice of the amount of expansion for cargo, and otherwise would be configured to retain its smaller, retracted size. Such a cargo carrier would desirably also safely extend beyond the tailgate or bumper of a vehicle.

SUMMARY

In one embodiment of the present invention, a cargo carrier for a vehicle comprises a housing. The housing includes an outer surface. The housing includes a first opening and a first door connected to the housing and configured to close the first opening. The first opening extends through the housing through a second end thereof to form an inner surface which provides a compartment for cargo storage. The housing also includes at least one module movably connected to the housing. The at least one module includes an outer surface and an opening which extends therethrough which forms an inner surface and a portion of the compartment for cargo storage. The outer surface of the module is configured to fit within the inner surface of a portion of the housing when the module is in a retracted position. The module is also configured to extend away from the portion of the housing in an extended position. A first margin of the module and a second margin of the housing overlap each other and connect together between the first margin and the second margin in the extended position. When the first margin and the second margin are released from their connection together, the module is movable into the portion of the housing, and the second margin of the housing abuts the third margin of the module to provide the retracted position.

In one aspect of the one embodiment, the module includes a button assembly and the button of the button assembly is positioned to retractably extend through an opening in the first margin of the module and an opening in the second margin of the housing to releasably connect the module and the housing together in the extended position. The second margin of the housing and the third margin of the module each include a portion of a clasp assembly. When the third margin of the module abuts a rim of the second margin of the housing, each portion of the clasp assembly is positioned to connect together to hold the housing and module in the retracted position. The third margin includes a frame, and the frame includes a door to permit access and closure to the module.

In another aspect of the one embodiment, the housing comprises at least one rib. In addition, the module includes at least one rib.

In yet another aspect of the one embodiment, the housing comprises a second opening and a second door to provide closure thereto.

In still another aspect of the one embodiment, the cargo carrier includes a pair of adjustable legs, and the pair of adjustable legs is carried by the at least one module.

In another embodiment of the present invention, a cargo carrier for a vehicle comprises a housing including a first opening formed therethrough which forms a first compartment therein for cargo storage. The housing includes at least one module movably connected to the housing. The module includes an opening therethrough that forms a second compartment in communication with the first compartment. The module is configured to fit within the housing in a retracted position and extend away from the housing in an extended position. A portion of the module and a portion of the housing overlap each other and connect together in the extended position. When the module is positioned within the portion of the housing, and an end portion of the module is positioned against a rim of the housing to provide the retracted position.

In one aspect of the other embodiment, the portion of the module includes a first margin and the portion of the housing includes a second margin. The first margin and the second margin overlap each other and connect together in the extended position. When the first margin and the second margin are released from their connection, the module is movable into the housing, and the second margin of the housing abuts the third margin of the module to provide the retracted position. The first margin of the module includes a button assembly such that the button is positioned to retractably extend through an opening in the first margin of the module and through an opening in the second margin of the housing to releasably connect the module and the housing together in the extended position. The second margin of the housing and the third margin of the module each include a portion of a clasp assembly. When the third margin of the module abuts a rim of the second margin of the housing, each portion of the clasp assembly is positioned to connect together to hold the housing and module in the retracted position. The third margin includes a frame, and the frame includes a door to permit access and closure to the module.

In another aspect of the other embodiment, the housing includes an opening covered by a door.

In yet another aspect of the other embodiment, the housing comprises at least one rib. The module also comprises at least one rib.

In still another aspect of the other embodiment, the cargo carrier includes a pair of adjustable legs. The pair of adjustable legs is carried by the at least one module.

DETAILED DESCRIPTION OF THE DRAWINGS

The disclosure will be better understood and features set forth above will become apparent when consideration is given to the following detailed description thereof. Such description makes reference to the annexed drawings wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. The variations of "comprising", "including" and "having", such as, but not by way of limitation, "comprise", "include", "have" or "has", are also included in this definition. Any examples of operating parameters and/or environmental conditions are not exclusive of other parameters/conditions of the disclosed embodiments.

Figure 1:
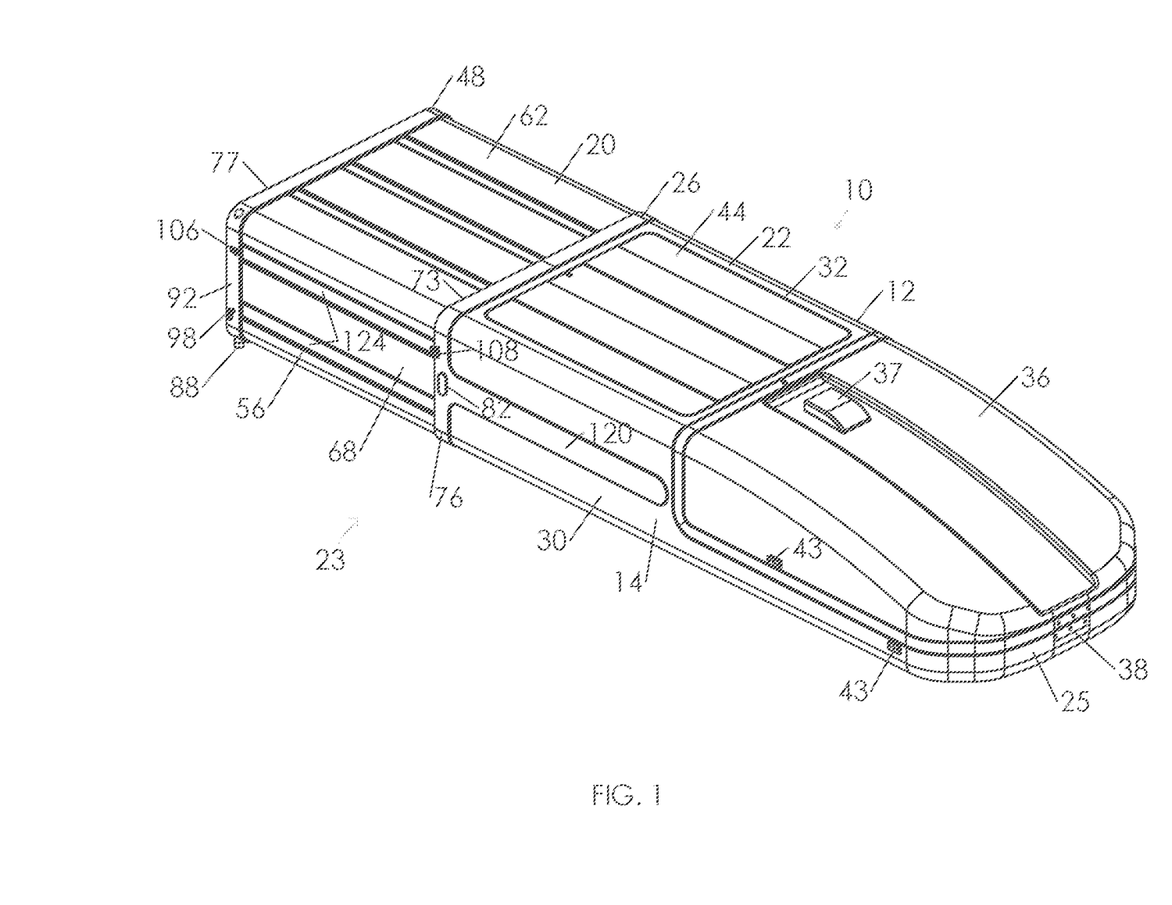
FIG. 1 is a right perspective view of the extendable cargo carrier for a vehicle according to the present invention, illustrating a fully extended position of the cargo carrier.
Figure 2:
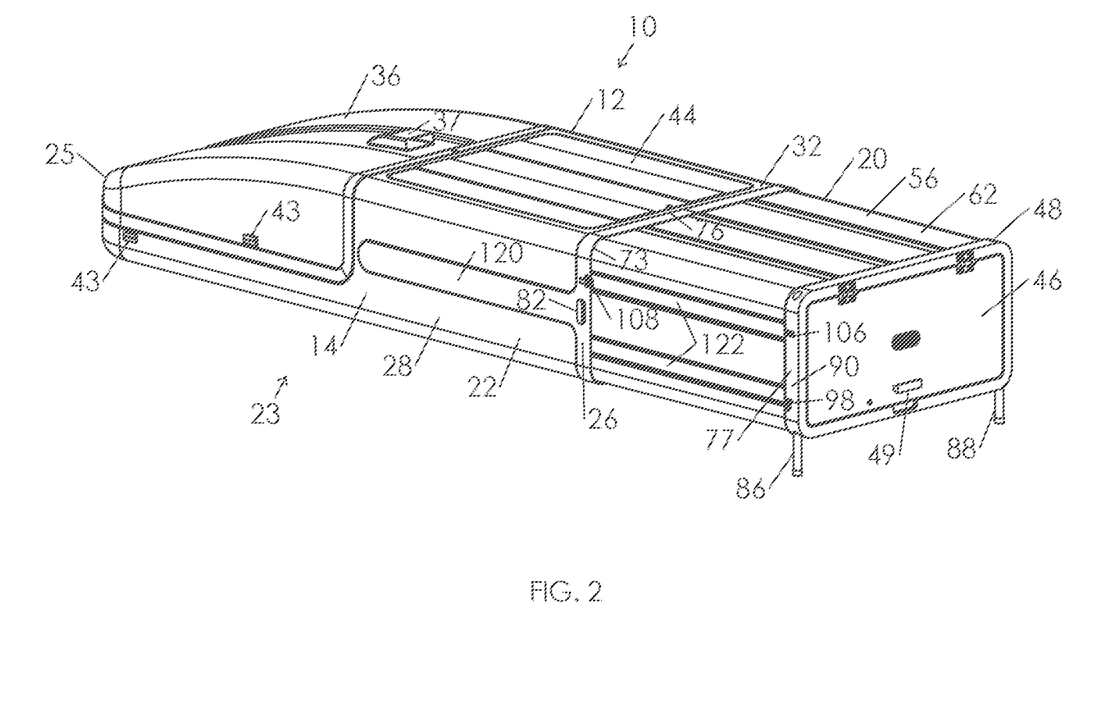
FIG. 2 is a left perspective view of the view of the extendable cargo carrier of FIG. 1.
Figure 3:
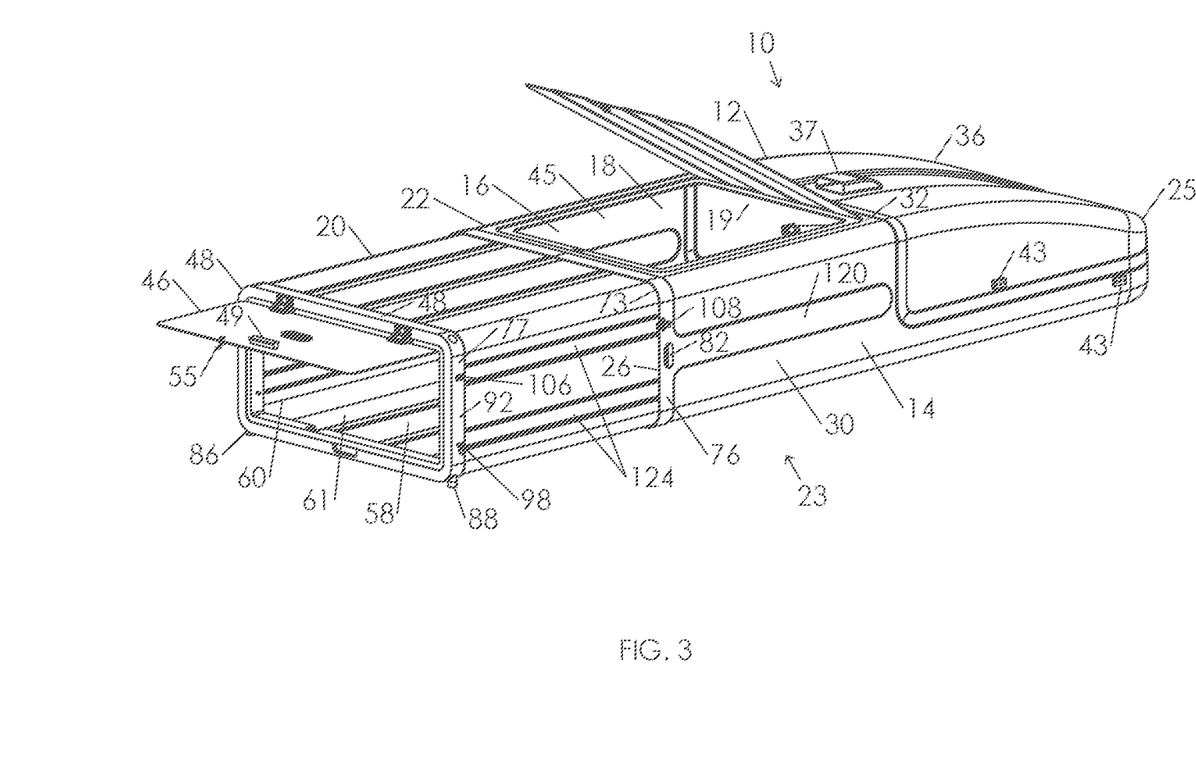
FIG. 3 is a right rear perspective view of the extendable cargo carrier of FIG. 1, showing two of the doors within the cargo carrier in an opened position.
Figure 4:
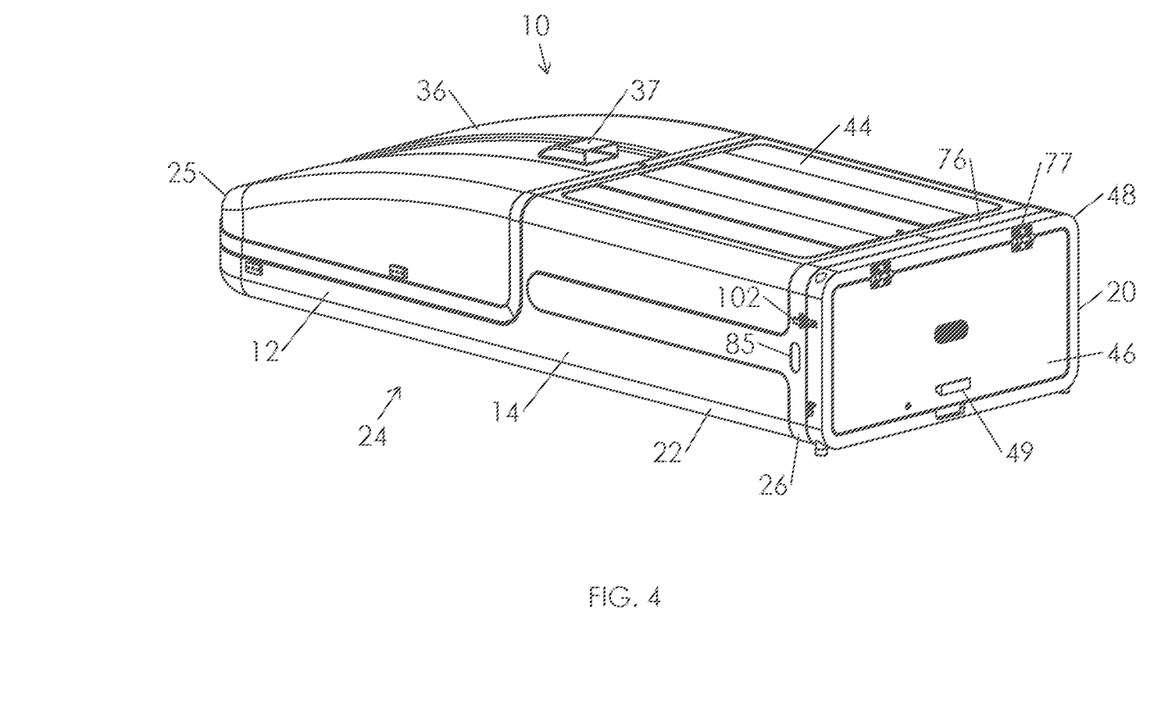
FIG. 4 is a left rear perspective view of the extendable cargo carrier of FIGS. 1 and 2, illustrating a retracted position of the cargo carrier.
Figure 5:
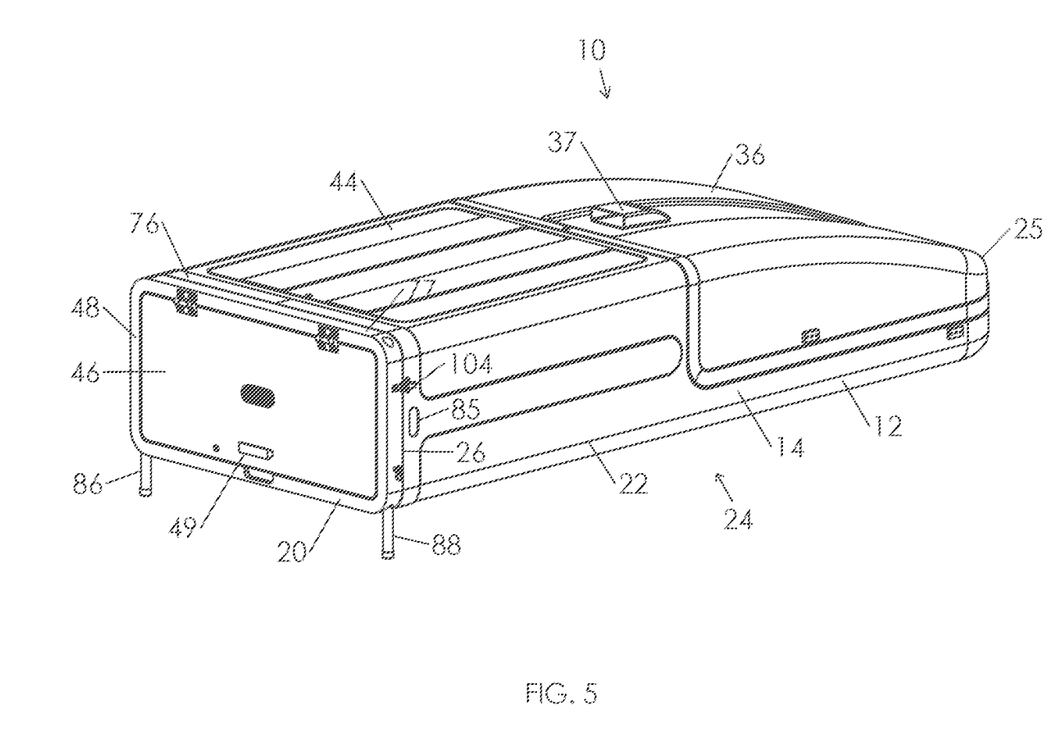
FIG. 5 is a right rear perspective view of the extendable cargo carrier of FIG. 4, showing the fully retracted position of the cargo carrier.
Figure 6:
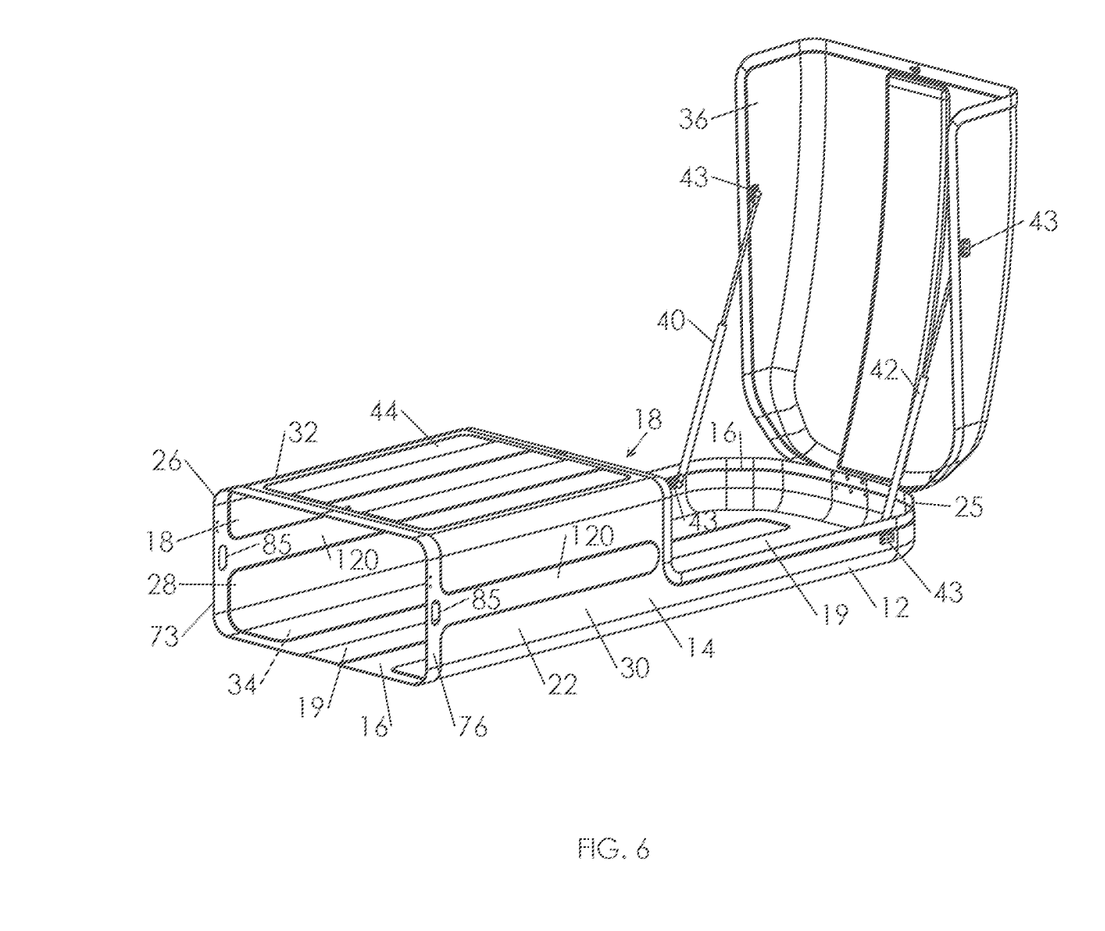
FIG. 6 is a perspective view of the housing of the extendable carrier for FIG. 1, showing a front cargo door in an open position.

Referring to FIGS. 1-3, the cargo carrier 10 for holding cargo on the roof top of a vehicle includes a housing 12. The housing 12 includes an outer surface 14 and an inner surface 16 which forms an opening 18 therethrough and a compartment 19 for carrying cargo (not shown). The housing 12 also includes, but not by way of limitation, a module 20 connected to the housing 12 which is extendable from a portion 22 of the housing 12 in an extended position 23 as shown in FIGS. 1-3. FIGS. 4 and 5 illustrate the module 20 positioned within the portion 22 of the housing 12 in a nested or retracted position 24.

Returning to FIGS. 1-3, the housing 12 also includes a front end 25, a back end 26, two opposing and spaced-apart sides 28, 30, an upper surface 32, and a lower surface 34. The cargo carrier 10 also desirably has a front cargo door 36 formed from portions of the front end 25, the upper surface 32, and each side 28, 30 of the housing 12. As illustrated in FIGS. 1-3 and 6, the front cargo door 36 forms a portion of the housing 12 which blends into the curved configuration of the housing 12 when closed, and desirably includes an outer handle 37. The front cargo door 36 is pivotally connected via a hinge 38 to the front end 25 of the housing 12 and its pivotal movement is controlled by a pair of telescoping rods 40, 42 positioned on each side 28, 30 of the housing 12 and held in position by a plurality of brackets 43. The front cargo door 36 in its opened position permits both wide and long access to cargo (not shown) positioned within the compartment 19 of the housing 12, and it also permits easy access to remove such cargo. The housing 12, as shown in FIG. 3, also includes an upper door 44 positioned over an opening 45 through the upper surface 32 of the portion 22 of the housing 12, to permit more limited access to the compartment 19 of the housing 12. The upper door 44 is desirably connected by a hinge (not shown) and is desirably closed via a latching device and/or locking device. Such devices are known in the art and commercially available. A rear closure for the housing 12 is provided in the module 20. The module 20 includes a rear door 46 connected to an end portion or a frame 48 which is positioned on a free end 50 of the module 20. The module 20 includes a front end 51 as well, which is carried by the housing 12, and which is connectable to the housing 12 and the portion 22 near a back end 26 of the housing 12 when the module is in the extended position. The rear door 46 may include a handle 49 which permits the rear door 46 to be lifted to position and/or access to cargo stored in the module 20. The rear door 46 is desirably connected to the frame 48 by a pair of hinges via a plurality of connectors 54 (such as, for example only, screws, bolts, and the like). The rear door 46 may also include a lock 55 (FIG. 3) to secure the rear door 46 from unwanted access.

The module 20, as illustrated in FIGS. 1-3, 7A, 7B, and 8A, has an outer surface 56 that is configured to fit within and substantially conform to the configurations of the portion 22 of the housing 12 when positioned in the retracted position 24. As used in this example, "substantially conform" means that the outer surface 56 will conform to the configurations of the inner surface 16 of the portion 22 by at least 80 percent, and more desirably, by at least 90 percent. The module 20 includes an opening 58 formed therethrough which forms an inner surface 60 and a compartment 61 therein. The outer surface 56 of the module 20 cooperates with the opening 18 in the portion 22 of the housing 12 and slides within and against the portion 22 of the housing 12 when in the retraced position 24, and the compartment 61 of the module 20 forms a part of the compartment 19 of the housing 12. The module 20 may be positioned to extend substantially outward, away from the portion 22 of the housing 12 in the extended position 23 to provide more storage space for cargo within the housing 12 such that the housing compartment 19 and the module compartment 61 cooperate to form a larger overall storage space. In this instance, "substantially outward" means at least 60 percent outward, and more preferably at least 80 percent outward, and most preferably at least 90 percent outward. The module includes an upper surface 62 and a lower surface 64, spaced-apart opposing sides 66, 68, and a front end 51.

Figures 7A, 7B:
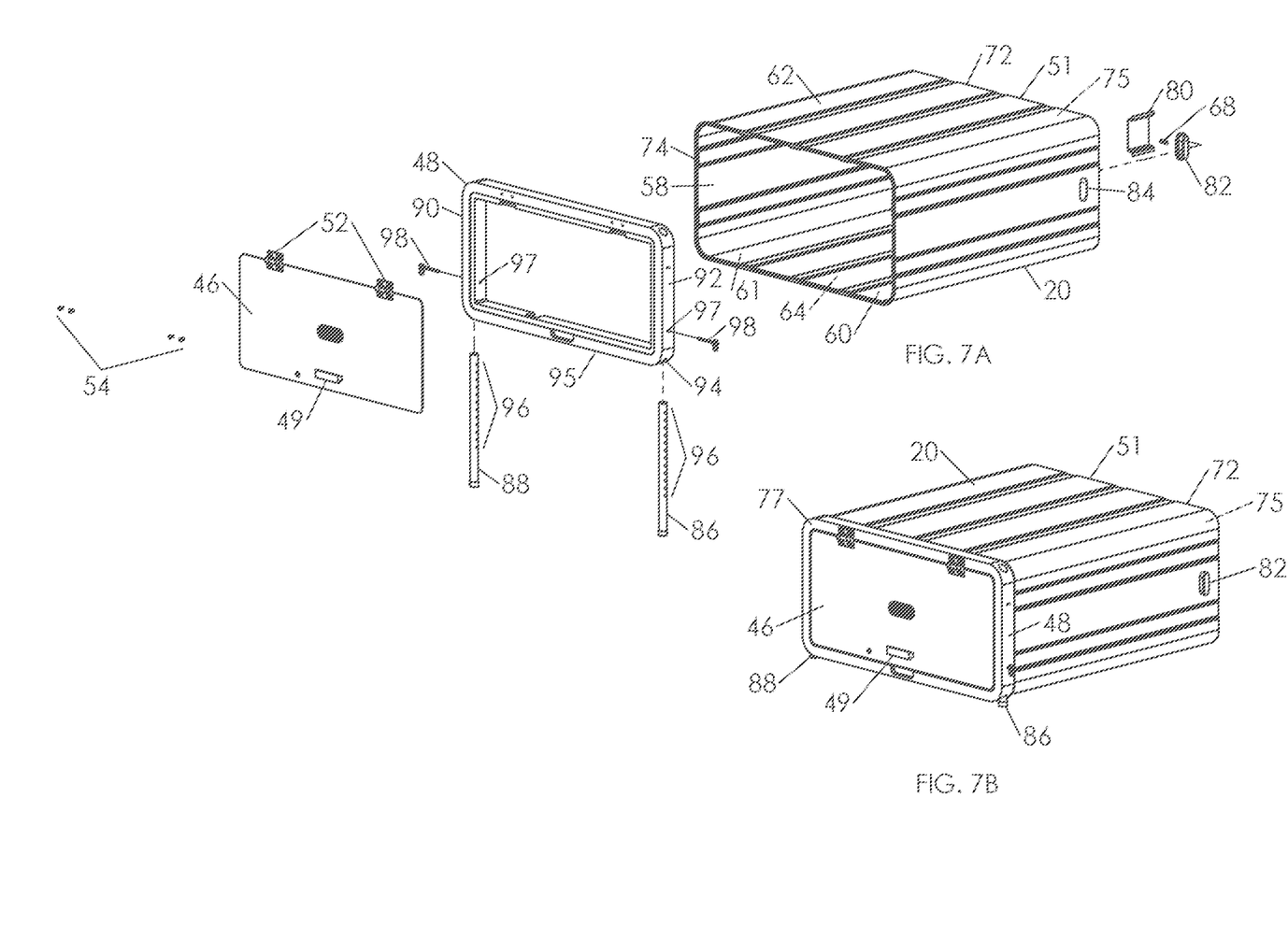
FIG. 7A is an exploded perspective view of the module shown in FIGS. 1 and 2, illustrating features of the module and showing the components of the legs, the frame, and the rear door.
FIG. 7B is an assembled perspective view of the module if FIG. 7A.
Figure 8A:
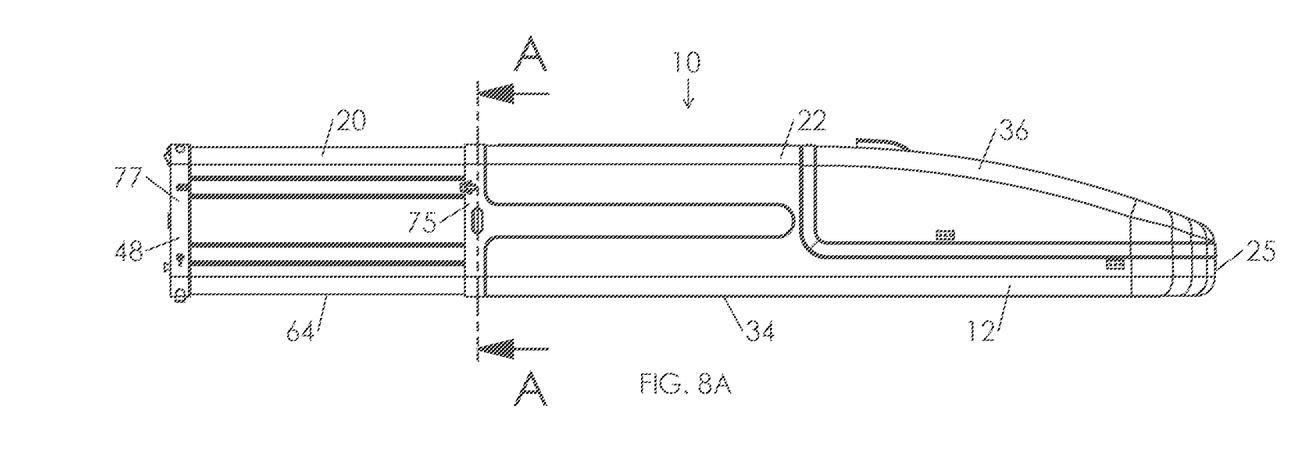
FIG. 8A is a side view of the extendable cargo carrier of FIGS. 1 and 2.
Figure 8B:
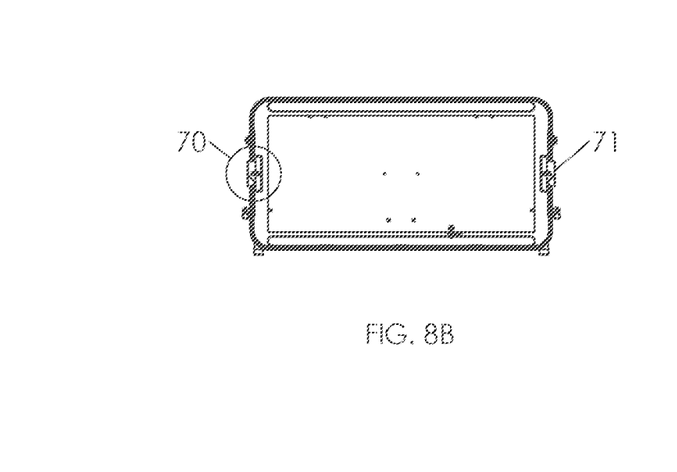
FIG. 8B shows the extendable cargo carrier of FIG. 8A taken along lines A-A.
Figure 8C:
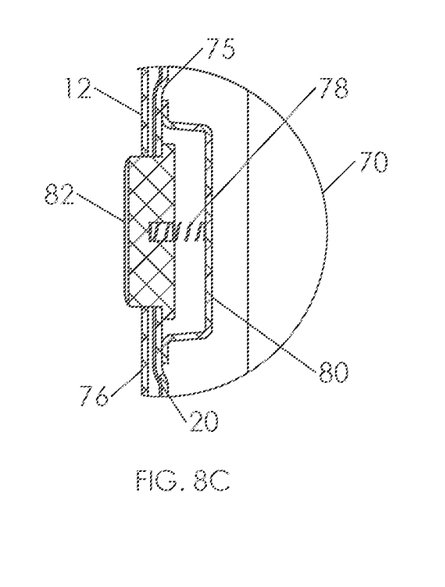
FIG. 8C is a cross sectional view of a portion of FIG. 8B, showing the button latching assembly and the position of the respective components when the button latch assembly connects the housing with the module.
Figures 9A, 9B:
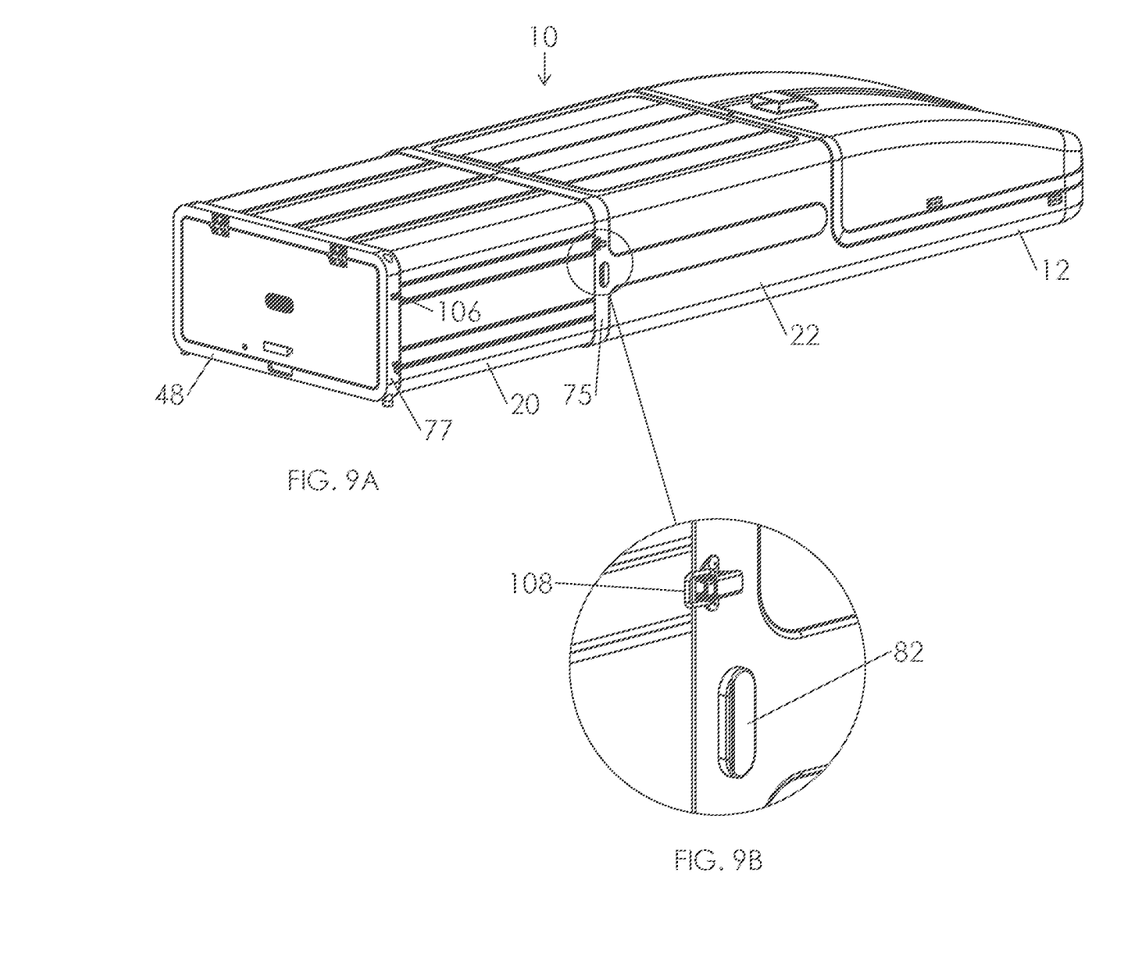
FIG. 9A is a right rear perspective view of the extendable cargo carrier.
FIG. 9B is an enlarged view taken from FIG. 9A, showing one button of the button latching assembly connecting the housing and the module together in the extended position, and one clasp of the pair of clasp assemblies.

Referring to FIGS. 7A and 8A, 8B, and 8C, the module 20, in the extended position, is releasably connected to the portion 22 of the housing 12, and is held in the extended position via respective pair of button latching assemblies 70, 71 positioned on each side 66, 68, respectively, of the inner surface 60 of the module 20, near the front end 51 thereof. The button latching assemblies 70, 71 are desirably positioned on a margin near the front end 51 of the module 20 and a margin near the back end 26 of the housing 12. A "margin" as used herein, means an area or first margin 75 which starts at a rim 72 of the front end 51 of the module 20, an area or second margin 76 which starts at a rim 73 at the back end 26 at the portion 22 of the housing 12, and an area or third margin 77 which starts at the frame 48 positioned on the rim 74 of the free end 50 of the module 20, and each first, second, and third margins 75, 76, 77 extends a) over a portion of the module 20 from the rim 72 (first margin 75), b) over a portion of the housing 12 from the rim 73 (second margin 76), and c) over a portion of the module 20 including the frame 48 positioned on the rim 74 (third margin 77), respectively. It will be understood that the second margin 76 and the third margin 77 are delineated generally by markings (lines spaced-apart but parallel to the rim 73 of the housing 12, and at least the frame 48 carried on the rim 74 of the free end 50 of the module 20), and the first margin 75 is delineated by phantom lines, as shown in FIG. 7A spaced front the front end 51 of the module 20. This description is intended to define the first, second, and third margins 75, 76, 77, respectively, as used herein.

In the extended position 23, the second margin 76 of the housing 12 overlaps the first margin 75 of the module, as illustrated in FIGS. 8A, 8B, 8C, 9A and 9B. Therefore, margins 75 and 76 are substantially aligned and overlapped when the cargo carrier 10 is in the extended position 23. "Substantially aligned and overlapped" means that first margin 75 and second margin 76 overlap each other by at least 60 percent, more desirably by at least 80 percent, and even more desirably by at least 90 percent. In the retracted position, as shown in FIGS. 4 and 5, the portion 22 of the housing 12 overlaps the module 20 and first margin 75 thereof when the module is moved within the housing 12. The second margin 76 of the housing 12, however, abuts the third margin 77 of the module 20 located on the frame 48, to place the cargo carrier in the retracted position 24.

Preferably, each first, second, and third margins 75, 76, 77, respectively, has a width 78 which is desirably, but not by way of limitation, a few inches, such as 0.5 to 1 inch extending from its respective rim 72, 73, 74. However, the width 78 of some margins may be wider, such as in a range of 0.5 to 3 inches, or 0.5 to 6 inches, and the like. It will be appreciated that one margin may be wider than another margin. It will also be understood that while the illustrated margins are identified on sides of the module 20 and sides of the housing 12, alternatively, one or more margins may be identified in other locations on the module 20 and/or the housing 12.

Turning back to FIGS. 8A, 8B, and 8C, each of the respective pair of button latching assemblies 70, 71 are positioned in the first margin 75 of each side 66, 68, respectively, of the module. Each button latching assembly of the pair 70, 71 includes, but not by way of limitation, a compression element, such as, but not by way of limitation, a spring 78. One end of each spring 78 may be positioned against a retaining plate 80. The retaining plate 80 is positioned against and connected to the inner surface 60 of the module 20 in the first margin 75. An opposite end of each spring 78 is positioned against a button 82. The spring 78 resiliently pushes the button 82 away from the retaining plate 80 and toward an opening 84 formed through the first margin 75 of each side 66, 68 of the module 20. Each button 82 is configured such that a portion thereof extends at least through a portion of each opening 84 in the first margin 75 of each side 66, 68 of the module 20, so that when the module 20 is moved into the extended position 23, each button 82 of the pair of button latching assemblies 70, 71 encounters a cooperating and aligned opening 85 formed through the second margin 76 on each side 28, 30 in the portion 22 of the housing 12. Each button 82 desirably extends through the opening in the second margin 76 thereby latching and securing the module 20 in the extended position 23 relative to the housing 12.

As shown in FIGS. 7A and 7B, the module 20 also includes a pair of legs 86, 88 which are positioned inside of each side, 90, 92, respectively, of the frame 48. Each leg of the pair of legs 86, 88 are extendable downward from each side 90, 92, respectively, of the frame 48 through a respective pair of lower apertures 94 (only one aperture 94 of the pair of apertures shown) formed through a lower surface 95 of the frame 48. Each leg 86, 88 also includes a plurality of openings 96 axially aligned on each leg 86, 88. Each side 90, 92 of the frame includes a side opening 97. Each pin of a pair of pins 98 is desirably positioned through each side opening 97 on each side 90, 92, respectively, of the frame 48, and each pin 98 desirably also extends into one of the plurality of openings 96 on each respective leg 86, 88 to hold each leg 86, 88 in a selected position. In this manner, the cargo carrier 10 may be raised or lowered relative to a surface below the cargo carrier, such as, for example, a surface of a vehicle. In the same manner, it will be understood that the pair of legs 86, 88 respectively, may be substantially retracted and held within each respective side 90, 92 of the frame 48, as well. In this instance, "substantially retracted" means that at least 80 percent of the length of the legs 86, 88 are held within the frame 48, and more desirably at least 90 percent of the length of the legs are held within the frame 48. The legs 86, 88 are desirably made from metal, plastic, or combinations thereof, and are known in the art and commercially available.

To move the module 20 out of the extended position 23 into the retracted position 24, each button 82 positioned through each opening 85 in each second margin 76 of each side 66, 68 of the housing 12 is desirably pushed inward while the module 20 is pushed or moved toward the housing 12. When the frame 48 (and the third margin 77 thereof) is positioned against the rim 73 of the back end 26 and the second margin 76 of the housing 12, as shown in FIGS. 4 and 5, a pair of clasp assemblies 102, 104 may be used to secure the module 20 in the retracted position 24 relative to the housing 12. Turning to FIGS. 1-3 and 9A and 9B, each clasp assembly 102, 104 includes a ring or hook 106 and a clasp 108 which releasably connects to the hook 106. In the present embodiment, but not by way of limitation, the hook 106 may be positioned on the third margin 77 on the frame 48. The clasp 108 may desirably be connected to the second margin 76 near the back end 26 of the housing 12. Each respective clasp 108 releasably connects to each respective hook 106 to hold each of the pair of clasp assemblies 102, 104 in a connected, closed position, which holds the frame 48 positioned at the free end 50 of the module 20 (margin 77) positioned against the rim 76 of the back end 26 of the housing 12 (margin 76). It will be understood that one clasp assembly or a plurality of clasp assemblies may be used. The clasp assemblies are desirably made from metal, and a variety of clasp assemblies are commercially available.

In addition, the module 20, the portion 22 of the housing 12, the front cargo (first) door 36 and the upper (second) door 44 may each include a lock to prevent unwanted access to the housing 12 or module 20. In addition, one or more locks may be used in any area to prevent unwanted access thereto. Such locks are known and are commercially available.

It will be appreciated that more than one module may be utilized, as shown, for example, in U.S. non-provisional patent application Ser. No. 17/531,964, which has been incorporated by reference herein. It will also be appreciated that the present module 20 may be connected such that it is positioned over the portion 22 of the housing, rather than within the portion 22 of the housing 12 (not shown). Therefore, when the module is extended in the extended position 23, the module 20 will move from the outside of the portion 22 of the housing 12 to connect to but extend away from the housing 12, and in the retracted position, the module 20 will be positioned over the portion 22 of the housing 12 (not shown).

The housing 12 desirably, but not by way of limitation, includes one or more ribs. For example, but not by way of limitation, a pair of ribs 120 are positioned on the housing 12, as illustrated in FIGS. 1-3. One of each of the respective pair of ribs 120 is positioned on each side 28, 30, respectively, of the portion 12 of the housing 12. In the same manner, but not by way of limitation, the module 20 also desirably, but not by way of limitation, includes one or more ribs. In this example, two pairs of ribs 122, 124, respectively, are positioned on each side 66, 68, respectively, of the module 20. Such ribs on the housing 12 and/or the module 20 may provide increased strength to a portion of the housing 12 or the module 20. In the previous examples, the such ribs may be formed as part of the housing 12 and/or module 20, as shown in FIGS. 1-3 and 7A. Alternatively, one or more ribs may be applied separately to the housing 12 and/or the module 20. In yet a further example, the housing 12 and/or the module 20 of the cargo carrier 10 may be provided without ribs.

The housing 12 and parts thereof, including the module 20, may be constructed from plastic and/or metal(s), and the like. Hardware such as, for example, but not by way of limitation, the spring(s) 78, and the retaining plate(s) 80, lock 55, and the like, may be constructed from metal and/or plastic. It will be appreciated that any material or combination of materials may be used for any component described herein, so long as the material or combination of materials perform as shown and described in detail herein.

Figure 10:
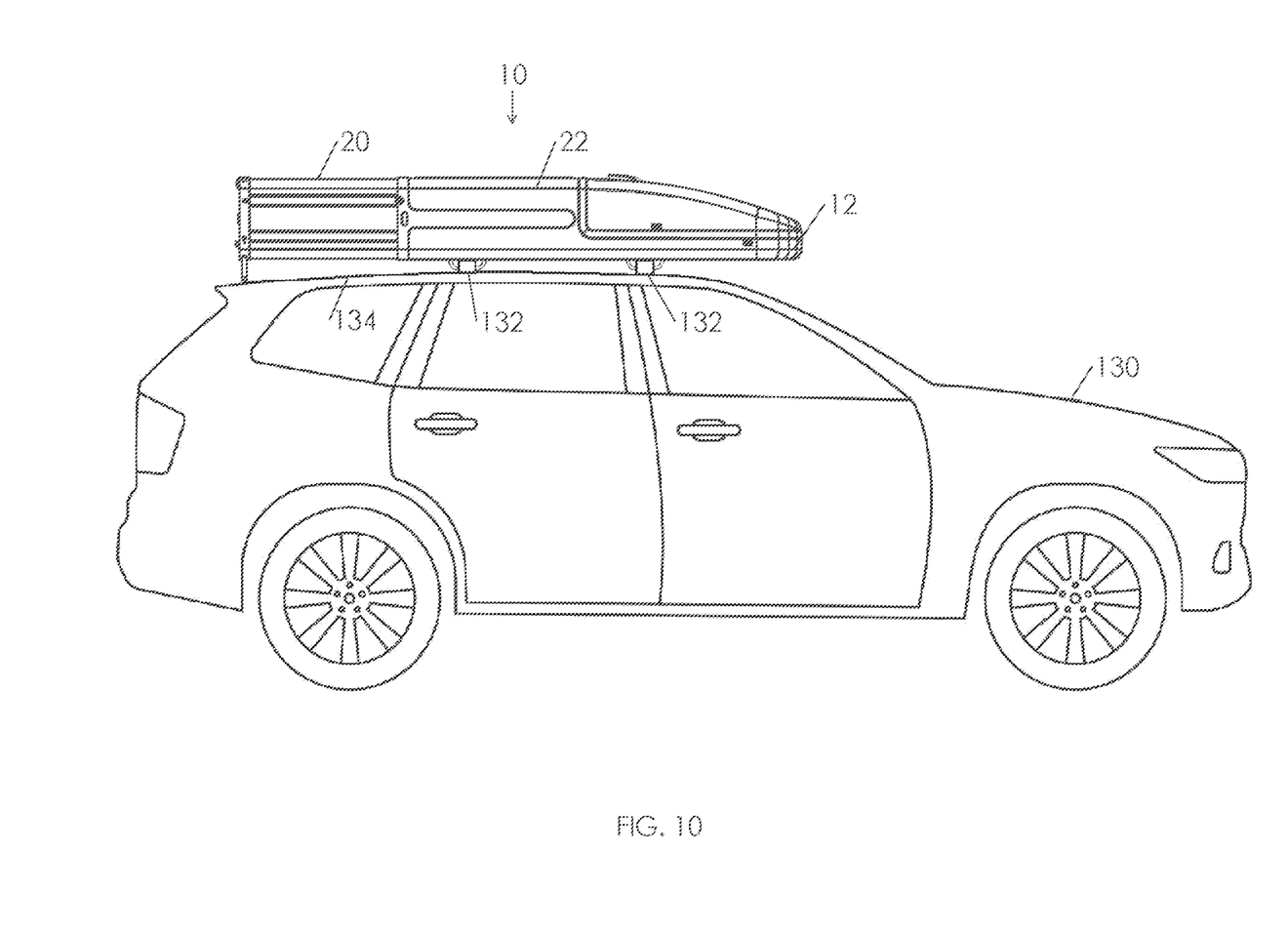
FIG. 10 is a side view of the extendable cargo carrier, positioned in an extended position and connected to a frame on a roof of a vehicle.

The cargo carrier 10 is desirably, but not by way of limitation, formed generally in a partial elliptical egg shape. However, it will be appreciated that other shapes of the housing 12 and/or module 20 are possible. The cargo carrier 10 is desirably mounted on a vehicle 130. It will be understood that the container 10 does not lie directly upon or have any portion open against the surface of a vehicle 130, such that the vehicle 130 provides any portion of the cargo carrier 10. And although the cargo carrier 10 desirably lies upon a frame 132 connected to the roof 134 of the vehicle 130, the cargo carrier 10 does not form a part of the frame 132. The cargo carrier 10 may also be mounted to a bed of a pickup-type truck, a roof or bed or a trailer, and the like. On a frame 132 of a vehicle 130, it will be appreciated that the cargo carrier 10 may be connected to such a frame 132 by connectors 136, such as, for example but not by way of limitation, U bolts, and the like.

The foregoing is considered as illustrative only of the principles of the disclosure. Further, since numerous modifications and changes will readily occur to those of ordinary skill in the art, it is not desired to limit the disclosure to the exact construction and operation shown and described, and accordingly, all suitable modifications and equivalents may be resorted to, and fail within the scope of this disclosure.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 132(f).

What is claimed is:

1. A cargo carrier for a vehicle, the cargo carrier comprising:

a housing including an outer surface, the housing including a first opening, and a first door connected to the housing and configured to close the first opening, wherein the first opening extends through the housing through a second end thereof to form an inner surface which provides a compartment for cargo storage;

at least one module movably connected to the housing, the at least one module including an outer surface and an opening which extends therethrough which forms an inner surface and another compartment for cargo storage, the outer surface of the module configured to fit within the inner surface of a portion of the housing when the module is in a retracted position, the module configured to extend away from the portion of the housing in an extended position, wherein a first margin of the module and a second margin of the housing overlap each other and connect together in the extended position, and when the first margin and the second margin are released from their connection together, the module is moved into the portion of the housing, and the second margin of the housing abuts the third margin of the module to provide the retracted position.

2. The cargo carrier of claim 1, wherein the module includes a button assembly, wherein a button of the button assembly is positioned to retractably extend through an opening in a first margin of the module and an opening in a second margin of the housing to releasably connect the module and the housing together in the extended position.

3. The cargo carrier of claim 2, wherein the second margin of the housing and the third margin of the module each include a portion of a clasp assembly that, when the third margin of the module abuts a rim of the second margin of the housing, each portion of the clasp assembly is positioned to connect together to hold the housing and module in the retracted position.

4. The cargo carrier of claim 3, wherein the third margin includes a frame, and the frame includes a door to permit access and closure to the module.

5. The cargo carrier of claim 1, wherein the housing comprises at least one rib.

6. The cargo carrier of claim 5, wherein the module comprises at least one rib.

7. The cargo carrier of claim 1, wherein the housing comprises a second opening and a second door to provide closure thereto.

8. The cargo carrier of claim 1, wherein the cargo carrier includes a pair of adjustable legs.

9. The cargo carrier of claim 8, wherein the pair of adjustable legs is carried by the at least one module.

10. A cargo carrier for a vehicle, the cargo carrier comprising:

a housing including a first opening formed therethrough which forms a first compartment therein for cargo storage; and at least one module movably connected to the housing, the module including an opening therethrough which forms a second compartment in communication with the first compartment, and the module is configured to fit within the housing in a retracted position and extend away from the housing in an extended position, wherein a portion of the module and a portion of the housing overlap each other and connect together when in the extended position, and when the module is positioned within the portion of the housing, an end portion of the module is positioned against a rim of the housing to provide the retracted position, wherein the portion of the module includes a first margin, and the portion of the housing includes a second margin, and the first margin and the second margin overlap each other and connect together in the extended position, wherein when the first margin and the second margin are released from their connection, the module is moved into the housing, and the second margin of the housing abuts a third margin of the module to provide the retracted position, and wherein the first margin of the module includes a button assembly, and the button is positioned to retractably extend through an opening in the first margin of the module and through an opening in the second margin of the housing to releasably connect the module and the housing together in the extended position.

11. The cargo carrier of claim 10, wherein the second margin of the housing and the third margin of the module each include a portion of a clasp assembly that, when the third margin of the module abuts a rim of the second margin of the housing, each portion of the clasp assembly is positioned to connect together to hold the housing and the module in the retracted position.

12. The cargo carrier of claim 11, wherein the third margin includes a frame, and the frame includes a door to permit access and closure to the module.

13. The cargo carrier of claim 12, wherein the housing includes an opening covered by a door.

14. The cargo carrier of claim 10, wherein the housing comprises at least one rib.

15. The cargo carrier of claim 14, wherein the module comprises at least one rib.

16. The cargo carrier of claim 10 wherein the cargo carrier includes a pair of adjustable legs.

17. The cargo carrier of claim 16, wherein the pair of adjustable legs is carried by the at least one module.

* * * * *